(12) United States Patent
Wang et al.

(10) Patent No.: US 11,603,871 B2
(45) Date of Patent: Mar. 14, 2023

(54) ASSEMBLED-TYPE FASTENER UNIT

(71) Applicant: FIVETECH TECHNOLOGY INC., New Taipei (TW)

(72) Inventors: Ting-Jui Wang, New Taipei (TW); Chia-Cheng Liu, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 345 days.

(21) Appl. No.: 16/996,917

(22) Filed: Aug. 19, 2020

(65) Prior Publication Data
US 2021/0088060 A1 Mar. 25, 2021

(30) Foreign Application Priority Data
Sep. 24, 2019 (TW) .................................. 108134489

(51) Int. Cl.
*F16B 1/00* (2006.01)
(52) U.S. Cl.
CPC ....................................... *F16B 1/00* (2013.01)
(58) Field of Classification Search
CPC combination set(s) only.
See application file for complete search history.

(56) References Cited

U.S. PATENT DOCUMENTS

| 4,875,299 A * | 10/1989 | Mabboux | A43B 5/0458 24/578.15 |
| 8,313,070 B2 * | 11/2012 | Kronner | A61B 90/57 248/231.51 |
| 10,468,068 B2 * | 11/2019 | Wang | G06F 1/181 |
| 10,626,906 B2 * | 4/2020 | Wang | F16B 35/005 |
| 2015/0296649 A1 * | 10/2015 | Wang | H05K 7/1409 403/326 |
| 2017/0002849 A1 * | 1/2017 | Wang | F16B 41/002 |
| 2018/0092234 A1 * | 3/2018 | Wang | H05K 7/1409 |

FOREIGN PATENT DOCUMENTS

CN 106763061 A 5/2017

\* cited by examiner

*Primary Examiner* — Monica E Millner (57) ABSTRACT

An assembled-type fastener unit includes a base, a handling member movably fitted in the base, and a locking device movably received in the handling member. The handling member can be operated for the locking device to extend out of the base to form a locked state or for the locking device to retract into the base to form an unlocked state. To use the fastener unit, the base is firstly connected to an object. Then, the handling member is operated for the locking device to extend out of the base and lock to a target object to form the locked state; or the handling member can be operated for the locking device to retract into the base to separate from a target object and form the unlocked state. Thus, at least two objects can be repeatedly and quickly connected to or disconnected from one another using the fastener unit.

20 Claims, 5 Drawing Sheets

ASSEMBLED-TYPE FASTENER UNIT

CROSS-REFERENCE TO RELATED APPLICATION

This non-provisional application claims priority under 35 U.S.C. § 119(a) on Patent Application No(s). 108134489 filed in Taiwan, R.O.C. on Sep. 24, 2019, the entire contents of which are hereby incorporated by reference.

BACKGROUND OF THE INVENTION

1. Field of the Invention

The present disclosure relates to an assembled-type fastener, and in particular to an assembled-type fastener unit that enables at least two objects to be repeatedly and quickly connected to or disconnected from one another.

2. Description of the Related Art

Generally, when at least one object is to be connected to another object, screws are often used to directly lock the two objects together.

However, while the conventional method enables fixed and non-easily-separable connection of at least one object to another object, the two objects so connected might still become unstably movable relative to each other.

It is therefore tried by the inventor to develop an assembled-type fastener unit in an attempt to enable repeatable and quick connection and disconnection of at least two objects to and from one another.

BRIEF SUMMARY OF THE INVENTION

An objective of the present disclosure is to overcome the disadvantage in the conventional fastening technique by providing an assembled-type fastener unit that enables repeated and quick connecting and disconnecting of at least two objects to and from one another.

To achieve at least the above objective, the assembled-type fastener unit provided according to the present disclosure includes a base, a handling member and a locking device. The handling member is movably fitted in the base, and the locking device is movably received in the handling member. The handling member can be operated for the locking device to extend out of the base to form a locked state, and the handling member can also be operated for the locking device to retract into the base to form an unlocked state.

In an embodiment of the above assembled-type fastener unit, the base includes at least one fixing section.

In an embodiment of the above assembled-type fastener unit, an elastic element is located between the base and the handling member; and the elastic element has an end pressed against the base and another end pressed against the handling member.

In an embodiment of the above assembled-type fastener unit, the handling member includes a guide path. The handling member is operable for the guide path to control the locking device to extend out of the base to form the locked state; and the handling member is also operable for the guide path to control the locking device to retract into the base to form the unlocked state.

In an embodiment of the above assembled-type fastener unit, the guide path is obliquely and slantly formed on the handling member.

In an embodiment of the above assembled-type fastener unit, the base includes a first opening, a second opening and an extending groove. The first opening and the second opening are correspondingly formed on two opposite side surfaces of the base; and the guide path of the handling member is located between the first and the second opening.

In another embodiment of the above assembled-type fastener unit, the base includes a first opening and an extending groove.

In an embodiment of the above assembled-type fastener unit, the locking device includes a locking element and a locating element. The locating element extends through the handling member and is engaged with the locking element. The handling member is operable to control the locating element, such that the locking element is caused to extend out of the base to form the locked state. And, the handling member is also operable to control the locating element, such that the locking element is caused to retract into the base to form the unlocked state.

In an embodiment of the above assembled-type fastener unit, when the handling member is operated for the locking device to form the locked state, the locking element has an end extended out of the base through the first opening and the locating element is moved in the handling member to an end of the guide path; and when the handling member is operated for the locking device to form the unlocked state, the extended end of the locking element retracts into the base via the first opening and another end of the locking element extends out of the base through the second opening, and the locating element is moved in the handling member to another end of the guide path.

In an embodiment of the above assembled-type fastener unit, the handling member has an anti-slip section provided on an outer end surface thereof.

In an embodiment of the above assembled-type fastener unit, the locating element moves on the guide path when the handling member is moving in the base, and the locking element is brought to move when the locating element moves.

In an embodiment of the above assembled-type fastener unit, an elastic element is located between the base and the handling member. The elastic element has an end pressed against the base and another end pressed against the handling member, so that the handling member is elastically reciprocatingly movable in the base. The handling member is operable for the locking device to extend out of the base to form the locked state; and the handling member is also operable for the locking device to retract into the base to form the unlocked state.

In an embodiment of the above assembled-type fastener unit, an elastic element is located between the base and the handling member. The elastic element has an end pressed against the base and another end pressed against the handling member, so that the handling member is elastically reciprocatingly movable in the base. The locking device extends out of the base to form the locked state when the elastic element is elastically released; and the locking device retracts into the base to form the unlocked state when the elastic element is elastically compressed.

In an embodiment of the above assembled-type fastener unit, when the handling member is operated for the locking device to form the locked state, the locking element has an end extended out of the base through the first opening and the locating element is moved in the handling member to an end of the guide path; and when the handling member is operated for the locking device to form the unlocked state, the extended end of the locking element retracts into the base via the first opening, and the locating element is moved in the handling member to another end of the guide path.

In an embodiment of the above assembled-type fastener unit, the locking device includes a locking element and a locating element engaged with each other. The locating element is movably fitted in the guide path, and the locking element is movable according to a movement of the locating element in the guide path.

In an embodiment of the above assembled-type fastener unit, the guide path is formed of two vertically spaced symmetrical channels, and the locking device includes a locking element and a locating element engaged with each other. The locating element is movably fitted in the guide path and the locking element is received in the guide path. And, the locking element is movable according to a movement of the locating element in the guide path.

In an embodiment of the above assembled-type fastener unit, the locking device includes a locking element and a locating element engaged with each other; and the locking element and the locating element can be assembled to each other or be integrally formed.

In an embodiment of the above assembled-type fastener unit, the guide path is obliquely and slantly formed on the handling member; and the locking device is movable in the oblique and slant guide path.

In an embodiment of the above assembled-type fastener unit, an elastic element is located between the base and the handling member. The elastic element has an end pressed against the base and another end pressed against the handling member, so that the handling member is elastically reciprocatingly movable in the base. The locking device extends out of the base to form the locked state when the elastic element is elastically compressed; and the locking device retracts into the base to form the unlocked state when the elastic element is elastically released.

In an embodiment of the above assembled-type fastener unit, the guide path is formed of two vertically spaced symmetrical channels, and the locking device includes a locking element and a locating element engaged with each other. The locating element is movably fitted in the guide path and the locking element is received in the guide path with a right angle included between the locking element and the locking element. And, the locking element is movable according to a movement of the locating element in the guide path.

To use the fastener unit, the base is firstly connected to an object. Then, the handling member is operated for the locking device to extend out of the base and lock to a target object to form the locked state. Or the handling member can be operated for the locking device to retract into the base and separate from a target object to form the unlocked state. Thus, at least two objects can be repeatedly and quickly connected to or disconnected from one another using the fastener unit of the present disclosure.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Please refer to FIGS. 1 to 7, in which an assembled-type fastener unit 2 according to a preferred embodiment of the present disclosure is shown. For the purpose of simplicity, the present disclosure is also briefly referred to as the fastener unit herein. The fastener unit 2 includes a base 21, a handling member 22, and a locking device 23. The handling member 22 is movably connected to and partially fitted in the base 21, and the locking device 23 is movably received in the handling member 22. By operating the handling member 22, the locking device 23 can be extended out of the base 21 to form a locked state. On the other hand, the handling member 22 can also be operated for the extended locking device 23 to retract into the base 21 to form an unlocked state.

To use the fattener unit 2, the base 21 is firstly connected to an object (not shown) via a plurality of fixing sections 25 formed on the base 21. Then, the fastener unit 2 is locked to a target object (not shown) to form the locked state. Or, the handling member 22 is operated for the fastener unit 2 to separate from the target object and form the unlocked state. In this manner, at least two objects can be repeatedly and quickly connected to or released from one another.

Figure 4:
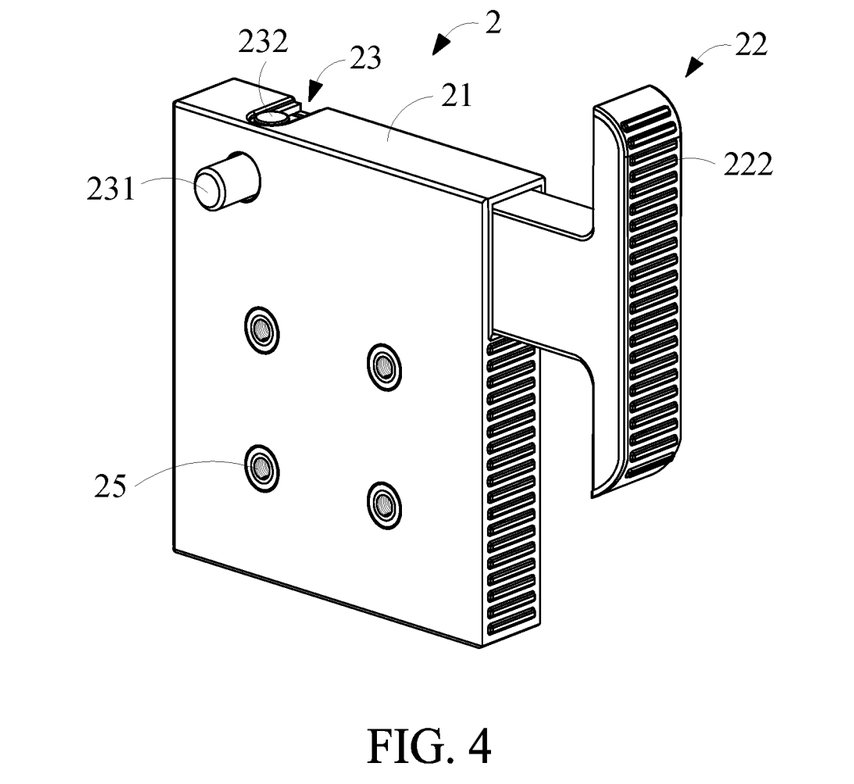
FIG. 4 is a perspective view showing the assembled-type fastener unit according to the preferred embodiment of the present disclosure in a locked state.
Figure 5:
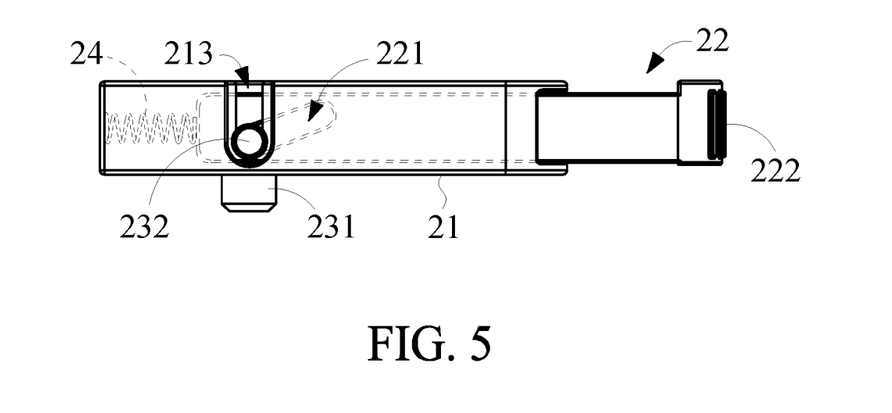
FIG. 5 is a partially sectioned top view of FIG. 4.

More specifically, to lock the fastener unit 2, a force is applied to the handling member 22, so that the handling member 22 moves in the base 21. At this point, the handling member 22 can be operated for the locking device 23 to extend out of the base 21 and lock to the target object, and the fastener unit 2 forms the locked state to connect at least two objects to one another.

Figure 6:
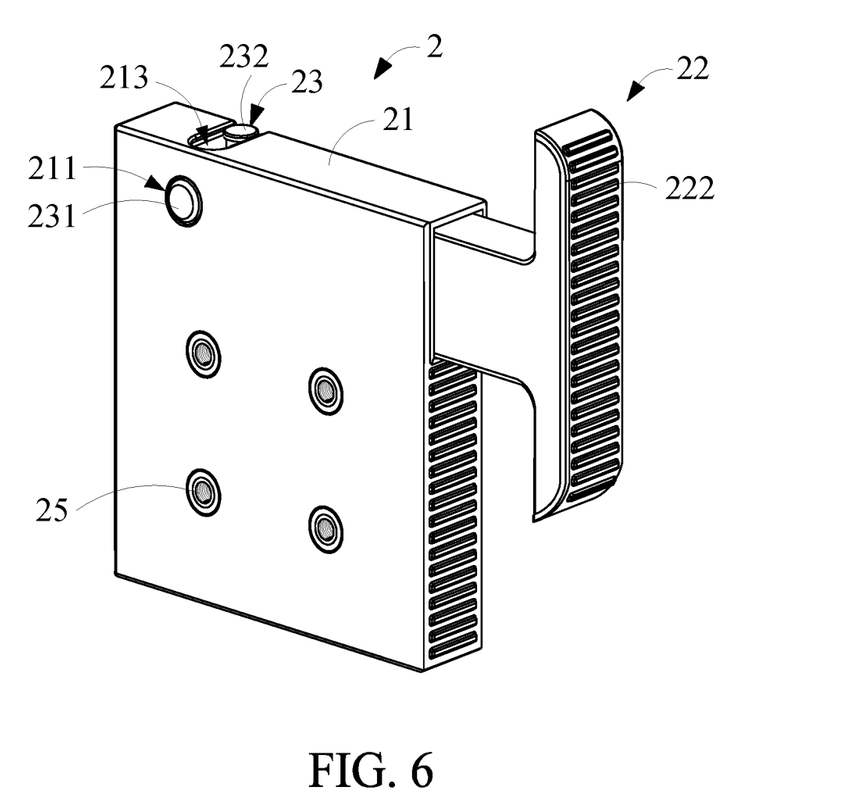
FIG. 6 is a perspective view showing the assembled-type fastener unit according to the preferred embodiment of the present disclosure in an unlocked state.
Figure 7:
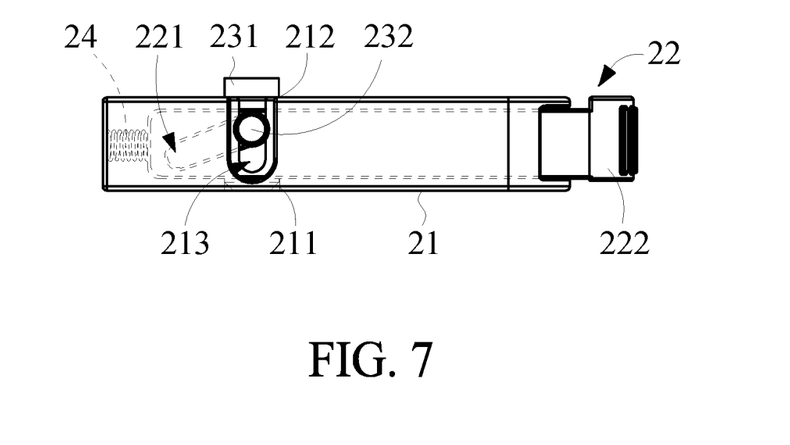
FIG. 7 is a partially sectioned top view of FIG. 6.

On the other hand, to unlock the fastener unit 2, also apply a force to the handling member 22 for it to move in the base 21. At this point, the handling member 22 can be operated for the locking device 23 to retract into the base 21 and separate from the target object, and the fastener unit 2 forms the unlock state to disconnect at least two objects from one another.

Figure 2:
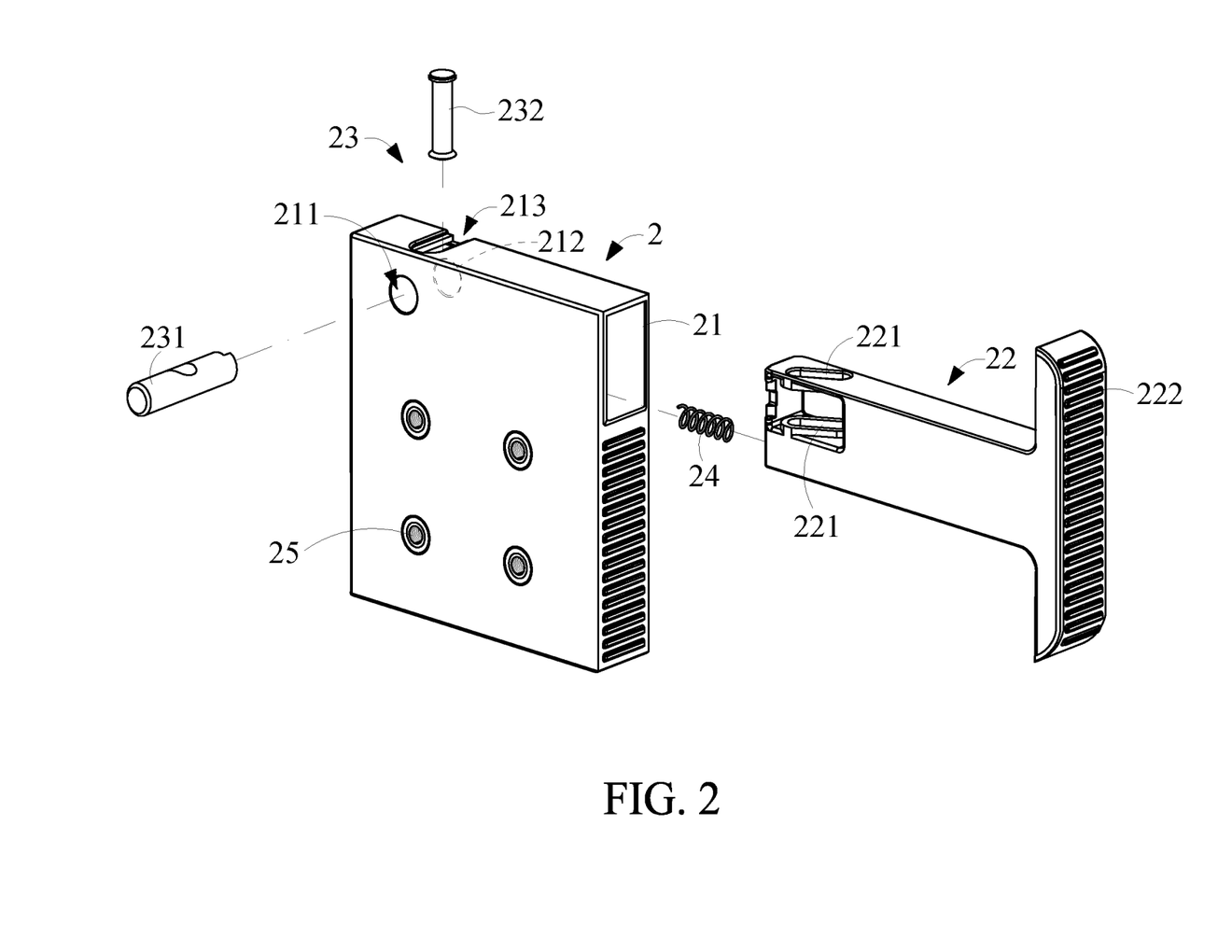
FIG. 2 is an exploded view of in FIG. 1.
Figure 3:
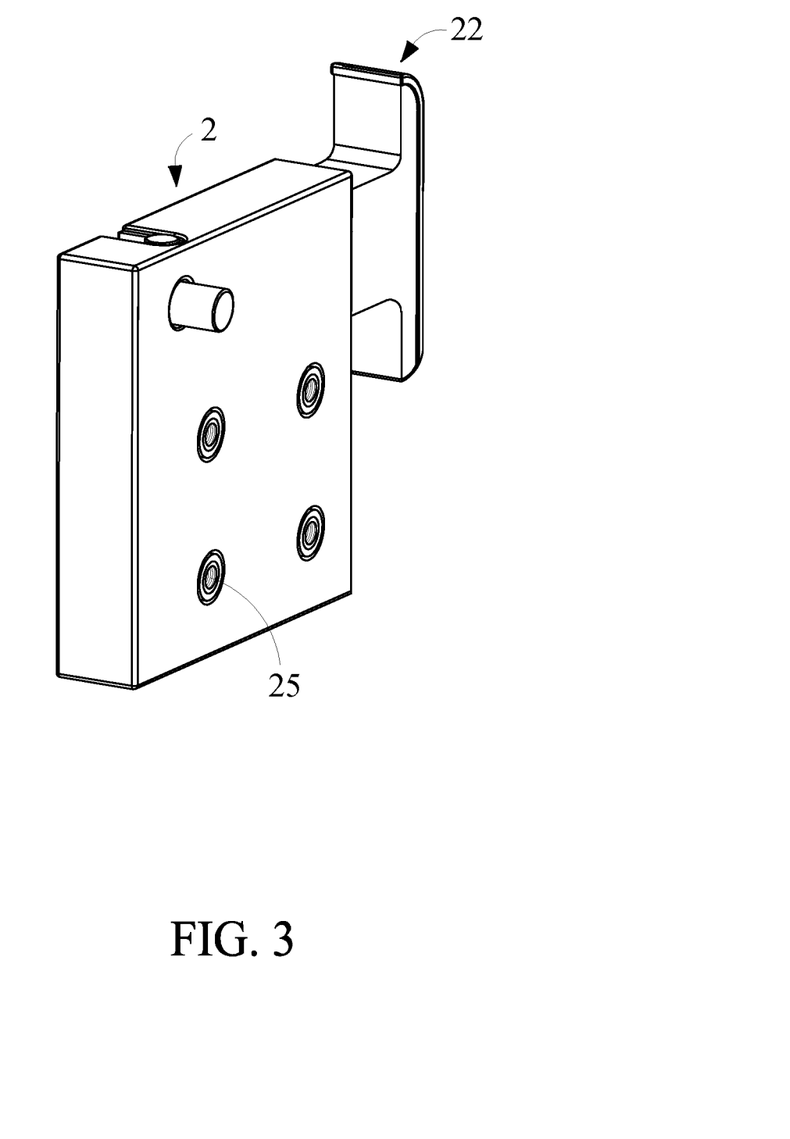
FIG. 3 is a perspective view of the assembled-type fastener unit according to the preferred embodiment of the present disclosure, being viewed from another lateral side thereof.

In the illustrated preferred embodiment of the present disclosure, an elastic element 24 is provided between the base 21 and the handling member 22. The elastic member 24 has an end pressed against the base 21 and another end pressed against the handling member 22. With this arrangement, the handling member 22 is elastically reciprocatingly movable in the base 21 and can be operated for the locking device 23 to extend out of the base 21 to form the locked state (the elastic element 24 is elastically released at this time), or can be operated for the locking device 23 to retract into the base 21 to form the unlocked state (the elastic element 24 is elastically compressed at this time). When the elastic element 24 is in the elastic force releasing state to push against the handling member 22, the locking device 23 is constantly extended out of the base 21 to form the locked state. When it is desired to fasten the fastener unit 2 in the locked state to the target object, simply apply a force for the handling member 22 to move in the base 21 and compress the elastic element 24, so that the locking device 23 retracts into the base 21 until it is located in alignment with the target object. Then, release the handling member 22. At this point, the elastic element 24 elastically extends and releases its elastic force to push against the base 21 and the handling member 22, and the handling member 22 can be operated for the locking device 23 to extend out of the base 21 and lock to the target object to form the locked state. To unlock the fastener unit 2, simply apply a force for the handling member 22 to move in the base 21 and compress the elastic element 24. At this point, the handling member 22 can be operated for the locking device 23 to retract into the base 21 and separate from the target object to form the unlocked state. When the handling member 22 is released again, the elastic element 24 elastically extends and releases its stored elastic force to push against the base 21 and the handling member 22. At this point, the handling member 22 can be operated for the locking device 23 to constantly extend out of the base 21 to form the locked state again and is ready for use next time. In the above manner, at least two objects can be repeatedly and quickly connected to and disconnected from one another using the fastener unit 2.

In the illustrated preferred embodiment, the handling member 2 has a guide path 221 axially obliquely and slantly formed thereon. The handling member 22 is operable for the guide path 221 to control the locking device 23 to extend out of the base 21 to form the locked state, or for the guide path 221 to control the locking device 23 to retract into the base 21 to form the unlocked state. Whereby, when the locking device 23 constantly extends out of the base 21 to form the locked state, an end of the guide path 221 is located in alignment with the locking device 23. And, when the handling member 22 is pushed and operated to move in the base 21, the guide path 221 is conveniently slidable on the locking device 23 until the other end of the guide path 221 is in alignment with the locking device 23. At this point, the locking device 23 is brought to retract into the base 21. In this manner, the locking device 23 can be either connected to the target object to form the locked state, or be removed from the target object to form the unlocked state, enabling at least two objects to be repeatedly and quickly connected to or disconnected from one another.

In the illustrated preferred embodiment, the base 21 includes a first opening 211, a second opening 212, and an extending groove 213. The first and the second opening 211, 212 are correspondingly formed on two opposite side faces of the base 21. The extending groove 213 is formed on a top surface of the base 21 and located between the first and the second opening 211, 212. Alternatively, in an operable embodiment that is not shown in the drawings, only the first opening 211 and the extending groove 213 are formed on the base 21. In the preferred embodiment, the locking device 23 includes a locking element 231 and a locating element 232. The locating element 232 vertically extends through the guide path 221 of the handling member 22 and is engaged with the locking element 231. The locating element 232 moves on the guide path 221 when the handling member 22 is moving in the base 21, and the locking element 231 is brought to move when the locating element 232 moves. The handling member 22 can be operated to control the locating element 232, such that the locking element 231 extends out of the base 21 to form the locked state or to retract into the base 21 to form the unlocked state. More specifically, the locating element 232 is movably fitted in the extending groove 213, and the locking element 231 is movable according to a movement of the locating element 232 in the extending groove 213.

Further, the guide path 221 in the present disclosure is formed of two vertically spaced symmetrical channels. The locating element 232 is movably fitted in the guide path 221 between the two channels of the guide path 221, and the locking element 231 is movably received in the guide path 221 and moves according to the movement of the locating element 232 in the guide path 221. The locking element 231 can be located in the guide path 221 between the two channels of the guide path 221 and is connected to the locating element 232 at a right angle. The locking element 231 and the locating element 232 of the locking device 23 can be assembled to each other or be integrally formed. The guide path 221 is obliquely formed on the handling member 22 and the two symmetrical channels thereof are extended in a slant state, so that the locking device 23 is movable on along the slant guide path 221.

When the handling member 22 is operated for the locking device 23 to form the locked state, an end of the guide path 221 is located in alignment with the locating element 232 of the locking device 23, and an end of the locking element 231 extends out of the base 21 through the first opening 211. Meanwhile, the locating element 232 is moved to an end of the extending groove 213 near the first opening 211. On the other hand, when the handling member 22 is operated for the locking device 23 to form the unlocked state, the locating element 232 slides on the guide path 221 until it moves to the other end of the guide path 221. At this point, the projected end of the locking element 231 is brought to retract into the base 21 via the first opening 211 and the other end of the locking element 231 extends out of the base 21 through the second opening 212. Meanwhile, the locating element 232 is moved to another end of the extending groove 22 near the second opening 212. In the locked state, the locking element 231 of the locking device 23 is locked to the target object; and in the unlocked state, the locking element 231 is separated from the target object. Therefore, at least two objects can be repeatedly and quickly connected to or disconnected from one another using the fastener unit 2 of the present disclosure.

Figure 1:
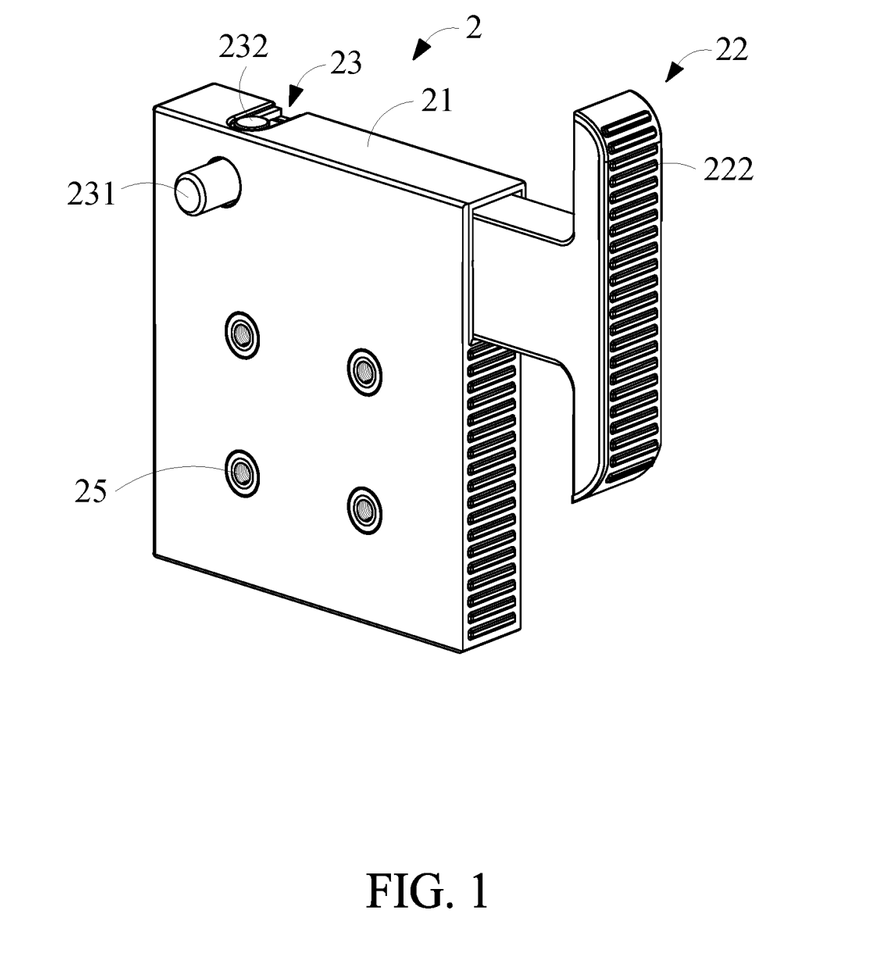
FIG. 1 is a perspective view of an assembled-type fastener unit according to a preferred embodiment of the present disclosure, being viewed from one lateral side thereof.

In the illustrated preferred embodiment, the handling member 22 has an anti-slip section 222 formed on an outer end surface thereof. A user can operate the handling member 22 by applying a force at the anti-slip section 222. With the anti-slip section 222, the fastener unit 2 is more ergonomically designed and the user can grip the handling member 22 without hand slipping.

While the present disclosure has been described by means of specific embodiments, numerous modifications and variations could be made thereto by those skilled in the art without departing from the scope and spirit of the present disclosure set forth in the claims.

What is claimed is:
1. An assembled-type fastener unit, comprising:
   a base, a handling member and a locking device; the handling member being movably fitted in the base, and the locking device being movably received in the handling member; the handling member being operable for the locking device to extend out of the base to form a locked state, and the handling member also being operable for the locking device to retract into the base to form an unlocked state;

wherein the base includes a first opening and a second opening; the first opening and the second opening being correspondingly formed on two opposite side surfaces of the base; and the guide path of the handling member being located between the first and the second opening;

wherein the locking device includes a locking element and a locating element; the locating element extending through the handling member and being engaged with the locking element; the handling member being operable to control the locating element, such that the locking element is brought to extend out of the base to form the locked state; and the handling member also being operable to control the locating element, such that the locking element is brought to retract into the base to form the unlocked state.

2. The assembled-type fastener unit according to claim 1, wherein the base includes at least one fixing section.

3. The assembled-type fastener unit according to claim 1, further comprising an elastic element located between the base and the handling member; and the elastic element having an end pressed against the base and another end pressed against the handling member.

4. The assembled-type fastener unit according to claim 1, wherein the guide path is obliquely and slantly formed on the handling member.

5. The assembled-type fastener unit according to claim 1, wherein, when the handling member is operated for the locking device to form the locked state, the locking element has an end extended out of the base through the first opening and the locating element is moved in the handling member to an end of the guide path; and when the handling member is operated for the locking device to form the unlocked state, the projected end of the locking element retracts into the base via the first opening and another end of the locking element extends out of the base through the second opening, and the locating element is moved in the handling member to another end of the guide path.

6. The assembled-type fastener unit according to claim 1, wherein the handling member has an anti-slip section provided on an outer end surface thereof.

7. The assembled-type fastener unit according to claim 1, wherein the locating element moves on the guide path when the handling member is moving in the base, and the locking element is brought to move when the locating element moves.

8. The assembled-type fastener unit according to claim 1, further comprising an elastic element located between the base and the handling member; the elastic element having an end pressed against the base and another end pressed against the handling member, so that the handling member is elastically reciprocatingly movable in the base; the handling member being operable for the locking device to extend out of the base to form the locked state; and the handling member also being operable for the locking device to retract into the base to form the unlocked state.

9. The assembled-type fastener unit according to claim 1, further comprising an elastic element located between the base and the handling member; the elastic element having an end pressed against the base and another end pressed against the handling member, so that the handling member is elastically reciprocatingly movable in the base; the locking device extending out of the base to form the locked state when the elastic element is elastically extended to release an elastic force; and the locking device retracting into the base to form the unlocked state when the elastic element is elastically compressed.

10. The assembled-type fastener unit according to claim 1, wherein, when the handling member is operated for the locking device to form the locked state, the locking element has an end extended out of the base through the first opening and the locating element is moved in the handling member to an end of the guide path; and when the handling member is operated for the locking device to form the unlocked state, the projected end of the locking element retracts into the base via the first opening, and the locating element is moved in the handling member to another end of the guide path.

11. The assembled-type fastener unit according to claim 1, wherein the locating element being movably fitted in the guide path, and the locking element being movable according to a movement of the locating element in the guide path.

12. The assembled-type fastener unit according to claim 1, wherein the guide path is formed of two vertically spaced symmetrical channels, and the locking element being received in the guide path.

13. The assembled-type fastener unit according to claim 1, wherein the locking device includes the locking element and the locating element engaged with each other; and the locking element and the locating element being assembled to each other or being integrally formed.

14. The assembled-type fastener unit according to claim 1, wherein the guide path is obliquely and slantly formed on the handling member; and the locking device being movable in the oblique and slant guide path.

15. The assembled-type fastener unit according to claim 1, further comprising an elastic element located between the base and the handling member; the elastic element having an end pressed against the base and another end pressed against the handling member, so that the handling member is elastically reciprocatingly movable in the base.

16. The assembled-type fastener unit according to claim 1, wherein the guide path is formed of two vertically spaced symmetrical channels, and the locking device includes the locking element and the locating element engaged with each other; the locating element being movably fitted in the guide path and the locking element being received in the guide path with a right angle included between the locking element and the locating element; and the locking element being movable according to a movement of the locating element in the guide path.

17. An assembled-type fastener unit, comprising:
a base, a handling member and a locking device; the handling member being movably fitted in the base, and the locking device being movably received in the handling member; the handling member being operable for the locking device to extend out of the base to form a locked state, and the handling member also being operable for the locking device to retract into the base to form an unlocked state;

wherein the base includes a first opening;

wherein the locking device includes a locking element and a locating element; the locating element extending through the handling member and being engaged with the locking element; the handling member being operable to control the locating element, such that the locking element is brought to extend out of the base to form the locked state; and the handling member also being operable to control the locating element, such that the locking element is brought to retract into the base to form the unlocked state.

18. An assembled-type fastener unit, comprising:

a base, a handling member and a locking device; the handling member being movably fitted in the base, and the locking device being movably received in the handling member; the handling member being operable for the locking device to extend out of the base to form a locked state, and the handling member also being operable for the locking device to retract into the base to form an unlocked state;

wherein the handling member includes a guide path; the handling member being operable for the guide path to control the locking device to extend out of the base to form the locked state; and the handling member also being operable for the guide path to control the locking device to retract into the base to form the unlocked state;

wherein the locking device includes a locking element and a locating element engaged with each other; the locating element being movably fitted in the guide path, and the locking element being movable according to a movement of the locating element in the guide path.

19. An assembled-type fastener unit, comprising:

a base, a handling member and a locking device; the handling member being movably fitted in the base, and the locking device being movably received in the handling member; the handling member being operable for the locking device to extend out of the base to form a locked state, and the handling member also being operable for the locking device to retract into the base to form an unlocked state;

wherein the handling member includes a guide path; the handling member being operable for the guide path to control the locking device to extend out of the base to form the locked state; and the handling member also being operable for the guide path to control the locking device to retract into the base to form the unlocked state;

wherein the guide path is formed of two vertically spaced symmetrical channels, and the locking device includes a locking element and a locating element engaged with each other; the locating element being movably fitted in the guide path and the locking element being received in the guide path; and the locking element being movable according to a movement of the locating element in the guide path.

20. An assembled-type fastener unit, comprising:

a base, a handling member and a locking device; the handling member being movably fitted in the base, and the locking device being movably received in the handling member; the handling member being operable for the locking device to extend out of the base to form a locked state, and the handling member also being operable for the locking device to retract into the base to form an unlocked state;

wherein the handling member includes a guide path; the handling member being operable for the guide path to control the locking device to extend out of the base to form the locked state; and the handling member also being operable for the guide path to control the locking device to retract into the base to form the unlocked state;

wherein the locking device includes a locking element and a locating element engaged with each other; and the locking element and the locating element being assembled to each other or being integrally formed.

\* \* \* \* \*